May 23, 1939. LE BARON W. KINNEY, JR  2,159,275
LIQUID LEVEL INDICATOR
Filed Aug. 24, 1935
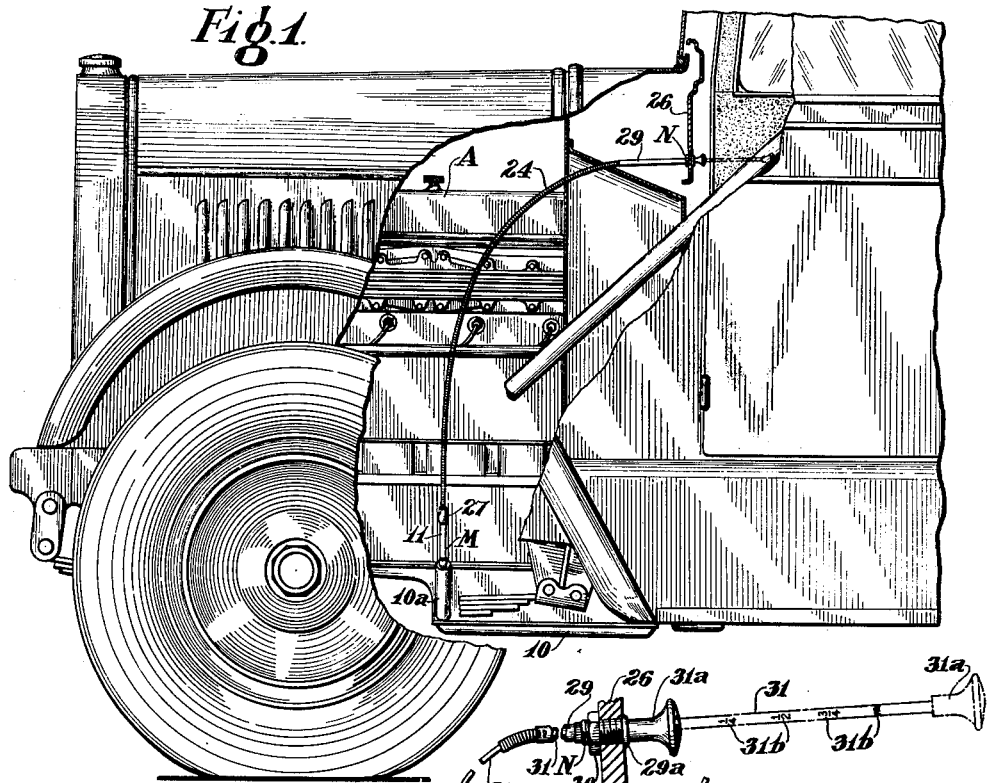
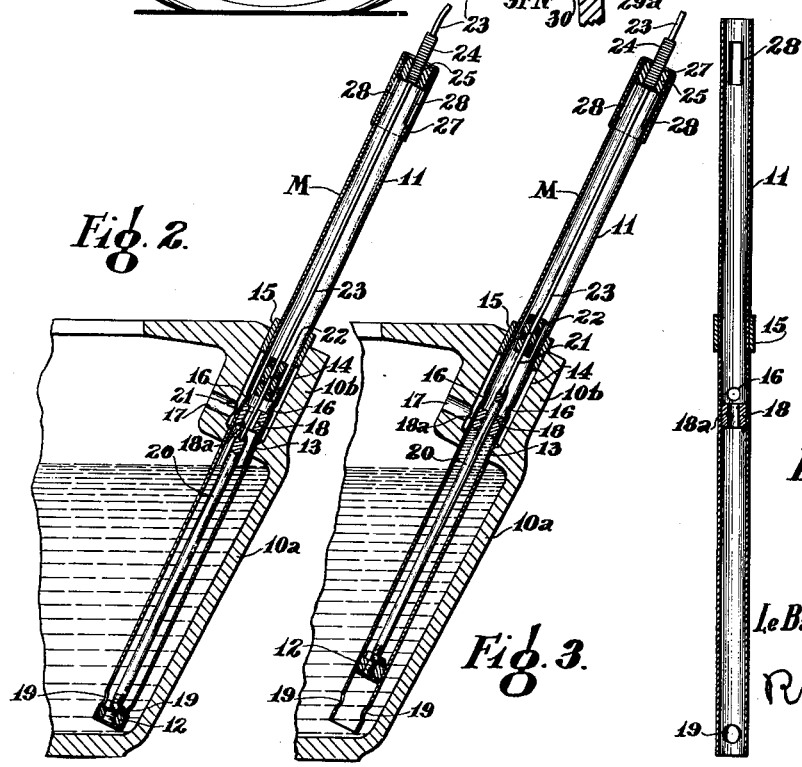
INVENTOR.
Le Baron W. Kinney, Jr.
R M Cooper
ATTORNEY.

Patented May 23, 1939

2,159,275

UNITED STATES PATENT OFFICE 2,159,275

LIQUID LEVEL INDICATOR

Le Baron W. Kinney, Jr., Cleveland, Ohio, assignor to The White Motor Company, Cleveland, Ohio, a corporation of Ohio Application August 24, 1935, Serial No. 37,746

4 Claims. (Cl. 73—290)

This invention relates to liquid measuring apparatus of the type disclosed in my prior application Serial No. 33,920, filed July 30, 1935 which matured into Patent Number 2,057,034.

It is an object of the invention to provide an apparatus for measuring the oil in an internal combustion engine which requires but a small amount of space within the engine and which can be readily dismounted for adjustment and repair.

Other objects will appear in the following description of one practical embodiment of the invention illustrated in the accompanying drawing, in which:

Figure 1 is a fragmentary side elevation of an automobile equipped with an oil measuring apparatus embodying the present invention, certain parts being broken away to show the installation of the oil measuring apparatus.

Figure 2 is a cross sectional view of the lower portion of the engine taken through the lower portion of the oil measuring apparatus, and a broken detail view of the portion of the oil measuring apparatus associated with the dash of the automobile.

Figure 3 is a sectional view of the lower portion of the engine and of the portion of the oil apparatus associated therewith, illustrating the position of the parts of the oil measuring apparatus in measuring the oil, and Figure 4 is a sectional view of the casing of the lower portion of the oil measuring apparatus.

Referring to the drawing, the automobile shown therein comprises an engine A constructed in the usual manner with a crankcase 10 located below the engine cylinder and serving as a lubricant reservoir. Mounted in an outwardly protruding portion 10a of the crankcase 10 there is a mechanism M comprising a tube 11 which extends downward to a point adjacent the bottom of the reservoir and a piston 12 reciprocally mounted within the tube 11. The tube 11 extends through and is supported in a boss 10b at the upper end of the portion 10a. The boss 10b is formed at its lower end with a bore 13 designed tightly to fit the tube 11 and at its upper end and throughout its central portion with a bore 14 substantially greater than the tube 11. The tube 11 is held in place by the wall of the bore 13 and by a collar 15 at the upper end of the bore 14, the collar being designed tightly to engage both the tube 11 and the wall of the bore 14. Thus an intermediate section of the tube spacedly occupies the bore 14.

The intermediate section of the tube 11 communicates through a pair of apertures 16 with the bore 14 in the boss 10b, and through a drilled hole 17 formed in the wall of the boss 10b with the upper portion of the crankcase obove the oil reservoir in such part. Mounted within the tube 11 below the apertures 16, there is a partition 18 constructed with a longitudinally extending bore 18a of less diameter than the bore of the tube designed to receive a part carried by the piston 12 in measuring the oil as hereinafter described. Near its lower end, the tube 11 is formed with a pair of apertures 19 which serve as communicating passages between the interior of the lower portion of the tube and the reservoir in the crankcase.

The piston 12 is operatively connected to an upwardly extending rod 20 constructed with a length such that its upper end is spaced a short distance from the apertured partition 18 when the piston 12 is at the lower end of the tube. The relative diameters of the rod 20 and the bore 18a are made, for a purpose later described, so as to provide a passage between the rod and the periphery of the bore which offers a large resistance to the passage of oil while permitting a relatively free flow of air. The rod 20 is connected at its upper end to a wire 21 constructed with a relatively smaller diameter. The wire 21 is connected through a coupling 22 to a second wire 23 which extends upward to a mechanism N mounted on the instrument panel 26 of the vehicle, the wire 23 being enclosed within a casing 24 intermediate the tube 11 and the mechanism N designed to prevent flexure of such wire during transmission of movement. The upper end of the tube is closed by a plug 25 which receives the lower end of the casing 24 for the wire 23, and by a sleeve 27 which covers two slots 28 cut in the side of the tube for assembly purposes, the construction at such end of the tube being substantially air tight.

The apertures 16 in the tube 11, the bores 14 and 17 in the boss 10b, and the bore 18a in the partition 18, provide for free communication between the interior of the crankcase and the interior of the lower portion of the tube when the piston is at the lower end of its stroke, and due to the upper end of the tube being closed as heretofore described so as to resist the free passage of air, result in the maintenance within the lower portion of the tube of pressures substantially equal to those created within the crankcase. The object of providing for the maintenance of equal pressures in the lower portion of the tube 11 and the upper portion of the crankcase 10 in the manner described is to allow accurate measurement of the oil when the engine is running. In the absence of such a provision, the fluctuation of pressures produced in the crankcase by reciprocation of the engine pistons would cause a fluctuation in the heighth of the oil in the tube 11 with the result that it would be impossible to obtain an accurate measurement of the oil in the crankcase.

The mechanism N comprises a casing member 29 mounted in the instrument panel 26 and held in place by a flange 29a and a nut 30. The forward end of the casing member 29 receives the upper end of the casing 24 and is tightly clamped in engagement therewith. Mounted within the casing member 29, there is a plunger rod 31 formed with a handle 31a and with measuring indicating marks 31b. The rod 31 is connected at its forward end of the wire 23 and through such wire, the wire 21, and the rod 20 to the piston 12, the arrangement being such that when the rod 31 is in the position shown in full lines in Figures 1 and 2, the piston 12 is at the bottom of the tube.

With the piston 12 in the position last referred to, the reservoir in the crankcase is in communication with the interior of the lower portion of the tube 11 and the level of the oil in the lower portion of the tube is maintained equal to the level in the crankcase. To measure the oil in the crankcase, the rod 31 is moved outward from the position shown in full lines in Figures 1 and 2 until a strong resistance to further movement is felt, after which the amount of oil in the reservoir in the crankcase is determined by the reading on the rod 31 with the flange 29a on the member 29 serving as an index. During the measuring operation, the air in the tube 11 intermediate the level of the oil and the partition 18 passes through the bore 18a and the apertures 16 into the bore 14 in the boss 10b, and through the bore 17 in the boss 10b into the reservoir in the crankcase, the air passing freely through the openings enumerated during the initial portion of the movement, and in a more restricted manner after the upper end of the rod 20 has been brought into the bore 18a.

Due to the rod 20 and the bore 18a having been constructed with relative diameters as previously described, the restriction to air flow produced by the rod 20 entering the bore 18a is insufficient to cause a great amount of resistance to upward movement of the piston, and the strong resistance to outward movement of the plunger rod 31 at which the pull on such part is released is not felt until all of the air originally within the lower portion of the tube has been exhausted and the oil in such portion brought into engagement with the lower surface of the partition 18.

After measurement of the oil in the crankcase, the rod 31 is returned to its original position. As the piston 12 is pushed downward, a partial vacuum is created within the lower portion of the tube in consequence of an oil seal having been set up between the rod 20 and the partition 18. This vacuum is destroyed at a point in the downward movement at which the upper end of the rod 20 leaves the aperture 18a in the member 18 establishing communication between the interior of the tube and the crankcase, and as a result the oil in the tube assumes the level of the oil in the crankcase. In the absence of means for destroying the partial vacuum created in the lower portion of the tube 11 as the piston 12 is moved downward, oil from the crankcase would be forced into the tube 11 by the greater pressure within the crankcase at the point in which the openings 19 are uncovered by the piston 12, the ingress of oil into the tube resulting in the establishment of a much higher oil level in such part than in the crankcase and operating to render future measurement inaccurate.

By providing the apparatus described with means for restricting the communication between the upper portion of the crankcase and the lower portion of the tube 11 during initial upward movement of the piston 12, a tube of much smaller diameter can be used than would otherwise be required. If such means were eliminated, as for instance by substituting for the rod 20 and the wire 21 a wire of the same diameter as the wire 21, the passage through the bore 18a would not act greatly to restrict the flow of oil in the upper portion of the tube during the measuring operation. As a result, it would be difficult to determine when the air within the lower portion of the tube has been exhausted and to release the pull on the rod 31 before the rod 31 has been moved out a substantial distance from the position at which exhaustion of air from the lower portion of the tube occurred. To overcome this difficulty, it would be necessary greatly to increase the diameter of the lower portion of the tube 11 in order to procure a sufficient amount of restriction to oil flow by the passage through the bore 18a to ensure accurate measurement.

Although the foregoing description is necessarily of a detailed character, in order that the invention may be completely set forth, it is to be understood that the specific terminology is not intended to be restrictive or confining and that various rearrangements of parts and structural details may be resorted to without departing from the scope or spirit of the invention as herein claimed.

I claim as my invention:

1. In a liquid level indicator for use with an engine crankcase having a boss fashioned with angularly related bores each open at both ends and in communication with each other, a hollow structure occupying one of said bores and comprising; an open lower end for positioning adjacent to the bottom of said crankcase, said structure having an opening in its side adjacent to its lower end, a partition located above the intended upper limit of liquid level in the crankcase and formed with an aperture of less size than the passage in said structure, there being a lateral opening located above said partition through which and through the partition aperture said crankcase may alternatively communicate, and a closure for the upper end of said structure; a piston mounted in said structure and adapted for movement between a point below the lower side opening of said structure and said partition, a rod operatively connected with said piston and extending upwardly therefrom, said rod having a length such that when said piston is at the lower end of its movement the upper end of the rod is spaced a short distance below said partition, and said rod being so constructed that it loosely closes the aperture in said partition when moved upward with said piston, and means for reciprocating said piston comprising; a part of smaller cross section than and operatively connected to said rod and adapted to extend through the aperture in said partition when said piston is at the lower end of its stroke whereby to then permit venting therearound through said lateral opening and through the other one of said bores, a slidably mounted operating plunger marked with measuring indicia, and a connection between said part and plunger and extending through said closure.

2. In a liquid level indicator for use with an engine crankcase or the like, the latter being provided with a bore in its top and with a laterally directed hole affording constant communication between said bore and the crankcase, a hollow structure tightly fitted into the lower end of said crankcase bore and spacedly occupying a higher section of said crankcase bore, said structure including: a partition located interiorly of said structure and above the intended upper limit of liquid level in the crankcase and formed with an aperture of less size than the passage in said structure, the lower end of said hollow structure being open and intended for positioning adjacent to the bottom of said crankcase and such lower end being furthermore provided with a lateral opening near its lower extremity, said hollow structure being also provided with a lateral opening located above said partition for establishing communication with the space between the hollow structure and crankcase bore and through which lateral opening and laterally directed hole said crankcase may communicate with said hollow structure, a closure for the upper end of said structure, a piston mounted in said structure and adapted for movement between a point below the lower lateral opening in said structure and said partition and an operating connection with said piston, movable through said closure, provided thereabove with measuring indicia and variously sized along its partition-intersecting section for alternative snug and loose occupancy of the aperture in said partition whereby correspondingly to lessen or increase venting therethrough respectively.

3. In a liquid level indicator for use with an engine crankcase or the like, a hollow structure comprising; a member fitted in an upper opening of said crankcase and having an open lower end for positioning adjacent to the bottom of said crankcase, said member also having a lateral opening near its lower end, apertured means located interiorly of said structure at a point above the intended upper limit of liquid level in said crankcase, there being an opening in the structure above the aperture means through which said crankcase may constantly communicate and a closure for the upper end of said structure; a piston mounted in said structure and capable of movement from a point below the lateral opening near the lower open end of said structure toward said apertured means and a variously sized actuating device connected with said piston and having a certain section adapted to close the aperture in said means against liquid at a predetermined stage of upward movement of said piston and having a smaller section adapted to permit venting therealong when said piston reaches its lowermost position.

4. In a liquid level indicator for use with an engine crankcase or the like, a hollow structure comprising; a membed fitted in an opening in said crankcase and having both an open lower end and a lateral opening adjacent thereto for positioning near the bottom of said crankcase, an apertured partition for restricting the structure passage at a point above the intended upper limit of liquid level in said crankcase, there being an opening in the structure above the partition through which said crankcase may constantly communicate with said hollow structure and a closure for the upper end of said structure; a piston mounted in said structure and capable of movement from a point below the lower lateral opening in said structure toward said partition, a variously sized rod structure operatively connected with said piston and extending upwardly therefrom, a larger section of said rod structure having a length such that when said piston is at the lower end of its movement its upper end is spaced a short distance below said partition, and said larger rod section being so constructed that it loosely closes the partition aperture when moved upward with said piston and an actuating structure connected with said rod structure including a member marked with measuring indicia.

LE BARON W. KINNEY, Jr.